(12) United States Patent
Valle et al.

(10) Patent No.: US 7,658,216 B2
(45) Date of Patent: Feb. 9, 2010

(54) TIRE FOR TWO-WHEELED VEHICLE COMPRISING LOOPED CROWN REINFORCEMENT

(75) Inventors: Alain Valle, Cebazat (FR); Pascal Prost, Riom (FR); Bernard Guerinon, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/053,443

(22) Filed: Feb. 9, 2005

(65) Prior Publication Data

US 2005/0217783 A1  Oct. 6, 2005

Related U.S. Application Data

(63) Continuation of application No. PCT/EP03/08708, filed on Aug. 6, 2003.

(30) Foreign Application Priority Data

Aug. 9, 2002  (FR) .................................. 02 10187
Nov. 18, 2002  (FR) .................................. 02 14415

(51) Int. Cl.
*B60C 9/22* (2006.01)
*B60C 9/18* (2006.01)
*B60C 9/20* (2006.01)
*B29D 30/16* (2006.01)
*B29D 30/38* (2006.01)
*B29D 30/70* (2006.01)

(52) U.S. Cl. ........................ 152/531; 152/533; 152/534; 152/551; 156/117

(58) Field of Classification Search ................. 152/526, 152/531, 533, 534, 551; 156/117
See application file for complete search history.

(56) References Cited

U.S. PATENT DOCUMENTS 3,024,828 A * 3/1962 Smith et al. .................. 152/533

(Continued)

FOREIGN PATENT DOCUMENTS

BE  564 481  6/1960

(Continued)

OTHER PUBLICATIONS

English machine translation of DE 2 118 748 cited by applicants.*

(Continued)

*Primary Examiner*—Adrienne C Johnstone
(74) *Attorney, Agent, or Firm*—Buchanan Ingersoll & Rooney PC

(57) ABSTRACT

A motorcycle tire includes at least one carcass-type reinforcement structure formed of reinforcement elements, anchored on either side of the tire to a bead whose base is intended to be mounted on a rim seat, each bead being extended radially towards the outside by a sidewall. The sidewalls meet up radially towards the outside with a tread. Under the tread there is a crown reinforcement structure including at least one layer of reinforcement elements known as a working layer which has at least one continuous reinforcement cord forming portions in the central zone thereof. Those central cord portions display identical angles of between 10-80 degrees formed with the longitudinal direction, the angles being measured at points of intersection of the cord with a circumferential plane. Two adjacent cord portions are linked by a U-shaped loop.

12 Claims, 5 Drawing Sheets

U.S. PATENT DOCUMENTS

| | | | | |
|---|---|---|---|---|
| 3,451,461 | A | * | 6/1969 | Wittneben .............. 152/551 X |
| 3,554,261 | A | * | 1/1971 | Mirtain et al. ........... 152/551 X |
| 4,399,187 | A | * | 8/1983 | Holroyd et al. ......... 152/533 X |
| 4,528,052 | A | * | 7/1985 | Yoshie et al. ................ 156/117 |
| 5,505,802 | A | * | 4/1996 | Debroche et al. ........... 156/117 |
| 6,089,293 | A | | 7/2000 | Niderost |
| 6,125,900 | A | | 10/2000 | De Loze de Plaisance et al. |
| 2003/0145935 | A1 | * | 8/2003 | Prost et al. .............. 152/531 X |

FOREIGN PATENT DOCUMENTS

| | | | | | |
|---|---|---|---|---|---|
| DE | 2 118 748 | | | 11/1972 | |
| EP | 1 072 443 | A2 | * | 1/2001 | |
| FR | 2 130 619 | | | 11/1972 | |
| JP | 50157473 | A | * | 12/1975 | |
| JP | 06055907 | A | * | 3/1994 | ................ 152/526 |
| JP | 06115311 | A | * | 4/1994 | ................ 152/526 |
| JP | 10081109 | A | * | 3/1998 | |
| JP | 11-048706 | | | 2/1999 | |
| JP | 2000211317 | A | * | 8/2000 | |
| JP | 2002144813 | A | * | 5/2002 | |
| WO | WO-02/09956 | A1 | * | 2/2002 | |

OTHER PUBLICATIONS

English machine translation of JP 11-48706 cited by applicants.*

\* cited by examiner

TIRE FOR TWO-WHEELED VEHICLE COMPRISING LOOPED CROWN REINFORCEMENT

This application is a continuation of International Application PCT/EP03/008708 filed on Aug. 6, 2003 and which claims priority of Patent Applications No. 02/10187 filed on Aug. 9, 2002 and No. 02/14415 filed on Nov. 18, 2002 in France.

BACKGROUND OF THE INVENTION

The present invention relates to a tire intended to be fitted on a vehicle and more particularly intended to be fitted on a two-wheeled vehicle such as a motorcycle.

Although not limited to such an application, the invention will be more particularly described with reference to such a motorcycle, or motorbike, tire.

Tire reinforcement armatures or tire reinforcements, in particular for motorcycle tires, are currently—and most frequently—formed by stacking one or more plies conventionally designated "carcass plies", "crown plies", etc. This way of designating reinforcement armatures stems from the manufacturing process, which consists of making a series of semi-finished products in the form of plies, provided with, often longitudinal, cord reinforcements, which are then assembled or stacked so as to build a tire blank. The plies are made flat, with large dimensions, and are then cut as a function of the dimensions of a given product. The plies are also assembled substantially flat in a first phase. The blank thus produced is then shaped into the toroidal profile typical of tires. The semi-finished products known as "finishing products" are then applied to the blank, in order to obtain a product which is ready for vulcanization.

Such a "conventional" type of process involves, in particular for the tire blank manufacturing phase, the use of an anchoring element (generally a bead wire), used to effect anchoring or retention of the carcass reinforcement in the tire bead zone. Thus, for this type of process, a turn-up is formed from a portion of all the plies constituting the carcass reinforcement (or of only some) around a bead wire disposed in the bead of the tire. The carcass reinforcement is thereby anchored in the bead.

The widespread use in the industry of this type of conventional process, despite numerous variants in the manner of producing the plies and the assemblies, has led the person skilled in the art to use a vocabulary derived from the process; hence the terminology in general use, comprising in particular the terms "plies", "carcass", "bead wire", "shaping" to designate transition from a flat profile to a toroidal profile, etc.

Tires now exist which do not strictly speaking comprise "plies" or "bead wires"which fit the above definitions. For example, document EP 0 582 196 describes tires manufactured without the aid of semi-finished products in the form of plies. For example, the reinforcement elements of the various reinforcement structures are applied directly onto the adjacent layers of rubber mixes, the whole being applied in successive layers onto a toroidal core whose shape allows the direct obtainment of a profile resembling the final profile of the tire in the process of being manufactured. Thus, in this case there are no longer "semi-finished products", or "plies" or "bead wires". The basic products such as the rubber mixes and the reinforcement elements in the form of cords or filaments are applied directly to the core. Since this core is toroidal in shape, the blank no longer has to be shaped in order to be transformed from a flat profile to a profile in the form of a torus.

Furthermore, the tires described in this document do not have the "traditional"carcass ply turn-up about a bead wire. This type of anchoring is replaced by an arrangement in which circumferential cords are disposed adjacent to said sidewall reinforcing structure, the whole being immersed in an anchoring or bonding rubber mix.

Assembly processes using a toroidal core also exist which use semi-finished products specially adapted for rapid, effective and simple laying on a central core. Finally, it is also possible to use a composite comprising certain semi-finished products to achieve certain architectural aspects (such as plies, bead wires, etc), while others are achieved by the direct application of mixes and/or reinforcement elements.

In the present document, so as to take account of recent technological developments both in the field of manufacture and in the design of products, the conventional terms such as "plies", "bead wires" etc are advantageously replaced by neutral terms or terms which are independent of the type of process used. Thus, the term "reinforcement of carcass type" or "sidewall reinforcement" may be used to denote the reinforcement elements of a carcass ply in the conventional process and the corresponding reinforcement elements, generally applied at the level of the sidewalls, of a tire produced according to a process not using semi-finished products. The term "anchoring zone", for its part, may denote both the "traditional" carcass ply turn-up about a bead wire of a conventional process and the assembly formed by the circumferential reinforcement elements, the rubber mix and the adjacent sidewall reinforcement portions of a bottom zone produced using a process involving application on a toroidal core.

As in the case of all other tires, we are witnessing the radialization of motorcycle tires, the architecture of such tires comprising a carcass reinforcement formed of one or two plies of reinforcement elements forming with the circumferential direction an angle which may be between 65° and 90°, said carcass reinforcement being radially surmounted by a crown reinforcement formed at least of generally textile reinforcement elements. Non-radial tires do still exist, however, and the invention also relates to them. The invention also relates to partially radial tires, that is to say whose reinforcement elements of the carcass reinforcement are radial over at least part of said carcass reinforcement, for example in the part corresponding to the crown of the tire.

Numerous crown reinforcement architectures have been proposed, depending on whether the tire is intended to be fitted at the front of the motorcycle or at the rear. A first structure consists, for said crown reinforcement, in using solely circumferential cables, and said structure is more particularly used for the rear position. A second structure, directly inspired by structures commonly used in passenger-vehicle tires, has been used to improve wear resistance, and consists in using at least two crown plies of reinforcement elements which are parallel to each other within each ply but crossed from one ply to the next, forming acute angles with the circumferential direction, such tires being more particularly suitable for the front of motorcycles. Said two crown plies may be surmounted radially by at least one ply of circumferential elements, generally obtained by helical winding of a strip of at least one reinforcement element coated with rubber. Patent no. FR 2 561 588 thus describes such a crown reinforcement, having at least one ply whose reinforcement elements form with the circumferential direction an angle which may vary between 0° and 8°, the modulus of elasticity of such elements amounting to at least 6000 N/mm$^2$, and, disposed between the carcass reinforcement and the ply of circumferential elements, a shock-absorption layer formed mainly of two plies of elements crossed from one ply to the next forming between them angles of between 60° and 90°, said crossed plies being formed of textile reinforcement elements having a modulus of elasticity of at least 6000 N/mm².

Document EP 0 456 933, with a view to providing a motorcycle tire with excellent stability at high speed as well as excellent contact with the ground, teaches for example that a crown reinforcement should be made with at least two plies: a first ply, radially the closest to the carcass reinforcement, being composed of cables oriented at an angle of between 40° and 90° relative to the circumferential direction and the second ply, radially the closest to the tread, being composed of cables wound helically in the circumferential direction.

U.S. Pat. No. 5,301,730, with a view to enhancing the drive ability of a tire designed for the rear of a motorcycle, proposes a crown reinforcement composed, proceeding from the radial carcass reinforcement to the tread, of at least one ply of substantially circumferential elements and two plies of elements crossed from one ply to the next and forming with the circumferential direction an angle which may be between 35° and 55°, elements of aromatic polyamide being suitable for use as the ply of elements parallel to the circumferential direction and aliphatic polyamide being suitable for the plies of crossed elements.

The production of motorcycle tires results in large curvature values if such tires are to be used on a camber. The invention is directed in particular at improving the properties of tire grip and drive ability for use on severe camber.

Studies carried out in this context have shown in particular that the presence of layers of reinforcement elements forming an angle with the longitudinal direction results in local circumferential and shearing rigidities which diminish near the edges of said layers, the tension at the ends of the reinforcement elements being zero. A local tension of zero for the reinforcement elements results in reduced effectiveness of said reinforcement elements in this zone. The rigidities of the edges of the layers are particularly important when the tire is used on the most severe cambers, when cornering, the part of the tire corresponding to said zones then facing the ground.

The invention aims to improve further the quality of motorcycle tires, without for all that impairing the other properties required to satisfy the users. More specifically, the invention is directed at improving tires comprising at least one layer of reinforcement elements forming an angle with the longitudinal direction.

SUMMARY OF THE INVENTION

This object has been achieved according to the invention by a tire comprising at least one carcass-type reinforcement structure, formed of reinforcement elements, anchored on either side of the tire to a bead whose base is intended to be mounted on a rim seat, each bead being extended radially towards the outside by a sidewall, the sidewalls meeting up, radially towards the outside, with a tread, said tire also comprising under the tread a crown reinforcement structure consisting of at least one layer of reinforcement elements, known as a working layer, said layer consisting of at least one continuous reinforcing cord forming in the central zone of said layer portions forming identical angles, formed with the longitudinal direction, said angles being measured at the points of intersection with a circumferential plane, in such a way that two adjacent portions are linked by a loop or bend formed by said cord, and the portions forming an angle with the longitudinal direction of between 10 and 80°.

Advantageously, in the case of a radial structure, the reinforcement elements of the carcass-type reinforcement structure form an angle of between 65° and 90° with the circumferential direction.

According to a preferred embodiment of the invention, in the central zone of said working layer the portions are equidistant from one another over all circumferential planes.

Variants according to other advantageous embodiments of the invention additionally provide for the portion patterns to be equidistant from one another over all circumferential planes. Portion pattern should be understood to mean an assembly of several portions disposed in a given, repeated configuration.

The longitudinal direction of the tire, or circumferential direction, is the direction corresponding to the periphery of the tire and defined by the rolling direction of the tire.

A circumferential plane or circumferential section plane is a plane perpendicular to the axis of rotation of the tire. The equatorial plane is the circumferential plane passing through the centre or crown of the tread.

The transverse or axial direction of the tire is parallel to the axis of rotation of the tire.

The central zone of a working layer is a circumferential zone of said layer axially between two lateral zones, axially outside said central zone. According to a preferred embodiment of the invention, this central zone is centered on the crown of the tire tread.

The term "cord" generally denotes any of monofilaments, multifilament fibers (possibly twisted around themselves) or assemblies such as textile or metal cables, plied yarn or alternatively any type of equivalent assembly such as, for example, a hybrid cable, this being the case whatever the material(s) or the possible treatment of these cords, for example surface treatment or coating or pre-sizing to improve adhesion to the rubber or any other material.

According to the invention, the working layer is made with at least one cord, of which no free end is present at the edges of said layer. Preferably, the layer is made with a single cord and the layer is of the "monofilament" type. However, industrial production of such layers results in discontinuities, in particular due to reel changes. A preferred embodiment of the invention consists therefore in using only a single or a small number of cords for a working layer and it is appropriate to arrange the beginnings and ends of cords in the central zone of said layer.

A tire produced thus according to the invention comprises a reinforcement structure under the tread which does not exhibit any reinforcement element free end at the level of the edges axially outside the working layers.

In the central zone of the working layers, that is to say in the part of the working layers which does not include the loops linking the portions together, the portions display identical angles formed with the longitudinal direction, said angles being measured at the points of intersection with a circumferential plane, whatever is said circumferential plane. In other words, for a given circumferential section plane, the portions all display the same angle formed with the longitudinal direction at the points of intersection with said circumferential section plane. Furthermore, the above-mentioned angle may vary depending on the circumferential section plane considered.

According to a previously mentioned preferred embodiment, in the central zone of the working layers the portions are equidistant from one another in circumferential section planes; the distance between adjacent portions being able itself to vary depending on the circumferential section plane considered, or more precisely, the distance between adjacent portions being capable of varying in the axial direction.

Such a tire is advantageously made using a method of the hard or toroidal core type which allows in particular positioning of the reinforcement elements in the quasi-final position; in fact, since a shaping stage is not required with this type of process, the reinforcement elements are not displaced any more after their positioning. If a method comprising a shaping stage, such as shaping or application of a flat ply on the profile of the tire, is used, the curvature of a motorcycle tire necessitates preparation of a special ply for allowing the obtainment of portions, displaying identical angles and possibly equidistant from one another over all circumferential planes, linked by a loop; in particular at the ends of the ply and therefore at the level of the loops, shaping in accordance with the curvature of a motorcycle tire results in variations in particular at the edges of the tire which modify the position of the reinforcement elements. This modification of the positions is additionally disrupted by the presence of the loops, which cause non-homogeneous modifications. For this reason, the various portions do not display angles, formed with the longitudinal direction, which are identical in the circumferential section planes. Likewise, they are not equidistant from one another in circumferential section planes.

In an advantageous variant of the invention, in particular in order to optimize the rigidities of the reinforcement structure along the meridian of the tire, and in particular at the edges of the working layers, the angles formed by said portions of the cord of the working layers with the longitudinal direction are variable in the transverse direction such that said angles are greater at the edges axially outside the layers of reinforcement elements relative to the angles of said portions measured at the level of the equatorial plane of the tire.

Use of a method of the hard core type which in particular allows positioning of the reinforcement elements in the quasi-final position without the need for a shaping stage exhibits further advantages. In fact, a method of the hard core type in particular allows simple angle variations distinctly greater than it is possible to obtain using processes comprising a shaping stage. Furthermore, said angle variations, said angle tending towards 90° at the edges of the working layers, result in an increase in pitch and promote production of the loops, due to the reduction in bulk.

The invention also proposes a tire comprising at least one carcass-type reinforcement structure, formed of reinforcement elements, anchored on either side of the tire to a bead whose base is intended to be mounted on a rim seat, each bead being extended radially towards the outside by a sidewall, the sidewalls meeting up radially towards the outside with a tread, and comprising under the tread a crown reinforcement structure consisting of at least one layer of reinforcement elements known as a working layer, said layer consisting of at least one continuous reinforcement cord forming portions in the central zone of said layer, such that two adjacent portions are linked by a loop, and such that said portions form an angle with the longitudinal direction of between 10 and 80°, said angles formed by said portions with the longitudinal direction being variable in the transverse direction in such a way that said angles are greater at the edges axially outside the layers of reinforcement elements relative to the angles of said portions measured at the level of the equatorial plane of the tire.

Advantageously, in the case of a radial structure, the reinforcement elements of the carcass-type reinforcement structure form an angle of between 65° and 90° with the circumferential direction.

According to preferred embodiments of the invention, the portions form an angle with the longitudinal direction of between 20 and 75°. Preferably, the angle is less than 50° and more preferably less than 40°.

According to a preferred embodiment of the invention, the crown reinforcement structure of the tire comprises at least two layers of reinforcement elements such that from one layer to the next the portions form between them angles of between 20 and 160° and preferably between 40 and 100°.

A first embodiment of the variant embodiment of the invention according to which the angles formed by said portions of the cord of the working layers with the longitudinal direction are variable in the transverse direction consists in varying the angle of the portions in monotonic manner from the equatorial plane of the tire as far as the edges of the working layer.

A second embodiment of this variant consists in making the angle develop by stages from the equatorial plane of the tire as far as the edges of the working layer.

A last embodiment of this variant consists in the angle developing such that given values are obtained for given axial positions.

These various embodiments of the variant embodiment of the invention according to which the angles formed by said portions of the cord of the working layers with the longitudinal direction are variable in the transverse direction allow in other words the obtainment of considerable circumferential rigidity of the crown reinforcement structure due to the presence of closed, that is to say small, angles in the crown zone of the tire, that is to say in the zone surrounding the equatorial plane. And, on the other hand, the presence of open angles, that is to say angles tending towards 45°, or even towards 90°, may be obtained at the edges of the working layer or more precisely at the level of the shoulders of the tire to improve the grip, drive ability, comfort, or indeed the operating temperature of the tire; in fact, such variations in angle allow adjustment of the shearing rigidities of the working layers.

A preferred embodiment of the invention provides for the tire to consist in particular of a crown reinforcement structure which additionally comprises at least one layer of circumferential reinforcement elements; according to the invention, the layer of circumferential reinforcement elements consists of at least one reinforcement element oriented according to an angle formed with the longitudinal direction of less than 5°.

The presence of a layer of circumferential reinforcement elements is in particular preferable for the production of a tire intended to be used at the rear of a motorcycle.

One advantageous embodiment of the invention provides for the layer of circumferential reinforcement elements to be positioned at least in part on a working layer. When the layer of circumferential reinforcement elements is provided on two working layers and placed directly under the tread, it may in particular contribute to the improvement of stability at high speed.

The layer of circumferential reinforcement elements may thus be provided directly under the tread to form, in addition to its primary function, a layer for protecting the carcass and the other layers of the crown reinforcement structure against any mechanical stresses which may occur.

The layer of circumferential reinforcement elements may additionally be provided between the working layers, in particular for economic reasons, the quantity of material and laying time thus being reduced.

Another advantageous embodiment of the invention provides for the layer of circumferential reinforcement elements to be positioned at least in part radially to the inside of the working layer radially furthest to the inside. According to this embodiment, the layer of circumferential reinforcement elements is provided radially to the inside of the working layers and may in particular allow the grip and drive ability of the tire to be improved.

Another variant of the invention provides for at least one layer of circumferential reinforcement elements to be positioned at least in part radially to the inside of the carcass-type reinforcement structure. This variant embodiment may also repeat the various positioning arrangements mentioned above in relation to the working layers. The carcass may thus cover the complete crown reinforcement structure. Preferably, the invention provides for at least one crown reinforcement layer to be positioned between the carcass and the tread to ensure protection of the carcass.

It should be noted that a tire according to the invention, in particular when at least part of the crown reinforcement structure is provided radially to the inside of the carcass structure, is advantageously produced according to a manufacturing method of the hard core or rigid form type.

One advantageous embodiment of the invention provides for the carcass-type reinforcement structure to consist of two half-plies extending for example from the shoulders to the beads. Depending on the nature, quantity and arrangement of the crown reinforcement elements, the invention effectively provides for the elimination of the carcass structure in at least a part of the zone of the tire located under the tread. Such a carcass structure may be embodied as taught in document EP-A-0 844 106. The above-mentioned relative positions of the various layers of the crown reinforcement structure are also compatible with such a carcass structure.

According to a preferred embodiment of the invention, the reinforcement elements of the working layers are of textile material.

Preferably also, the reinforcement elements of the layer of circumferential reinforcement elements are metal and/or textile and/or glass. The invention in particular provides for the use of reinforcement elements of various types in one and the same layer of circumferential reinforcement elements.

Preferably also, the reinforcement elements of the layer of circumferential reinforcement elements have a modulus of elasticity greater than 6000 N/mm$^2$.

In an advantageous variant of the invention, a layer of circumferential reinforcement elements may be provided in several parts positioned at various radial positions or different levels of the tire. Such a tire may in particular comprise a part of the layer of circumferential reinforcement elements radially to the outside of the other reinforcement elements in the central part of the tire, that is to say under the central part of the tread. This part of the layer of circumferential reinforcement elements thus allows in particular protection of the carcass against any stresses which may affect the central part of the tread, considered as the most exposed. Lateral parts of the layer of circumferential reinforcement elements, independent of the central part of said layer of circumferential reinforcement elements, may be positioned at any level, that is to say either radially to the inside of the working layers or between them or indeed radially to the inside of the carcass layer, in particular with a view to reducing the quantity of reinforcement elements and the time required to produce such a layer of circumferential reinforcement elements. The invention additionally provides, in the case of a layer of circumferential reinforcement elements made in several parts positioned in different radial positions, for the distribution of these various parts not to be symmetrical relative to the equatorial plane, or circumferential plane passing through the centre of the crown of the tire. Such an asymmetrical distribution may additionally be associated with the selection of different materials from the circumferential reinforcement elements, as mentioned above.

In accordance with this type of embodiment of a layer of circumferential reinforcement elements divided into several parts, the invention advantageously provides covering of the axial ends of said parts between them.

DESCRIPTION OF THE DRAWINGS

Other advantageous details and features of the invention will become clear below from the description of examples of embodiment of the invention made with reference to FIGS. 1 to 6, in which.

DESCRIPTION OF PREFERRED EMBODIMENTS

To simplify understanding thereof, the FIGS. 1 to 6 are not to scale.

Figure 1:
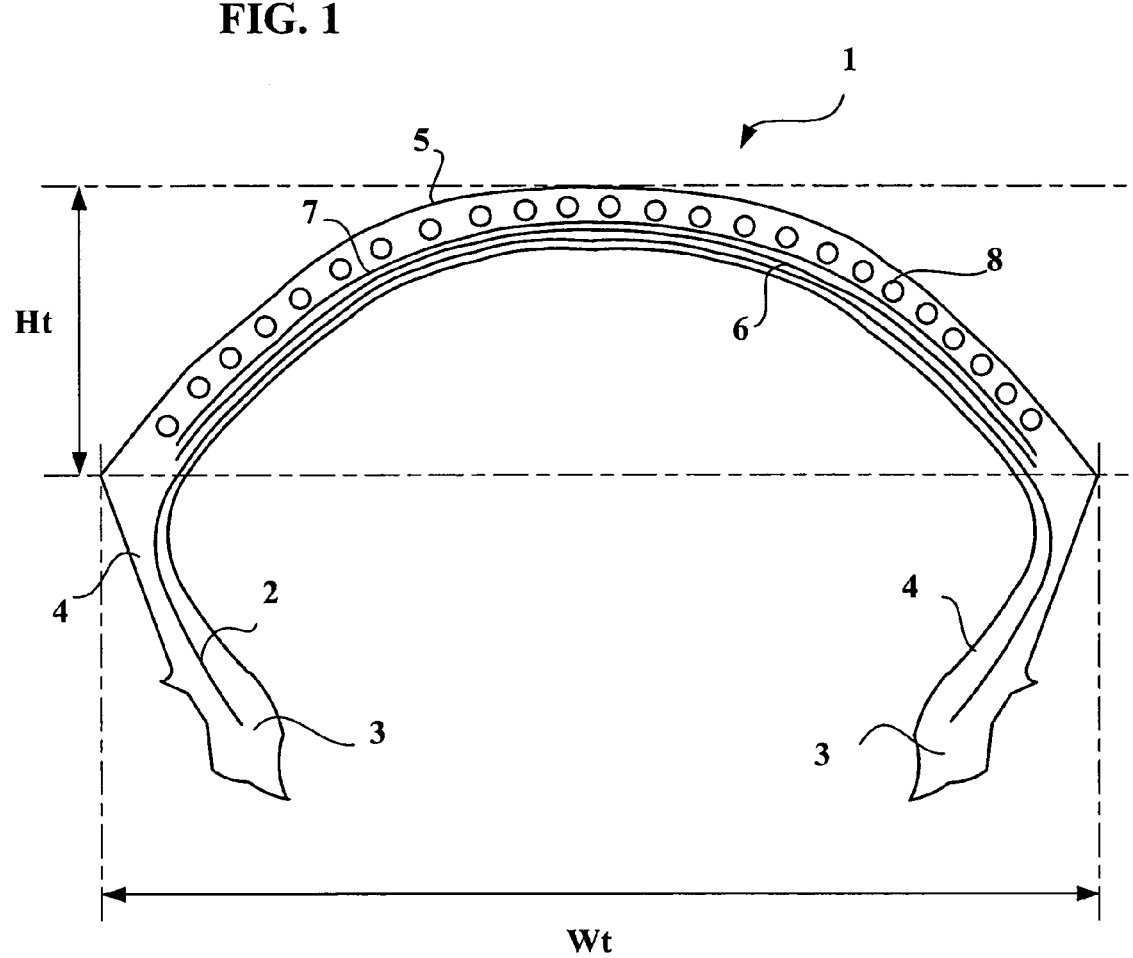
FIG. 1 is a meridian view of a diagram of a tire according to one embodiment of the invention.

FIG. 1 shows a tire 1 comprising a carcass reinforcement consisting of a single layer 2 comprising reinforcement elements of textile type. The layer 2 consists of reinforcement elements disposed radially. The radial positioning of the reinforcement elements is defined by the laying angle of said reinforcement elements; a radial arrangement corresponds to a laying angle of said elements relative to the longitudinal direction of the tire of between 65° and 90°.

Said carcass layer 2 is anchored on either side of the tire 1 in a bead 3 whose base is intended to be mounted on a rim seat. Each bead 3 is extended radially towards the outside by a sidewall 4, said sidewall 4 meeting up radially towards the outside with the tread 5. The tire 1 thus constituted has a value of curvature greater than 0.15 and preferably greater than 0.3. The value of curvature is defined by the Ht/Wt ratio, that is to say by the ratio of the height of the tread to the maximum width of the tread of the tire, which tire width corresronds to the maximum width of the tire as is evident from FIGS. 1 and 4-6. The value of curvature will advantageously be between 0.25 and 0.5 for a tire intended to be fitted at the front of a motorcycle and it will advantageously be between 0.2 and 0.5 for a tire intended to be fitted at the rear.

Between the carcass and the tread there is positioned a crown reinforcement consisting in the present case of two working layers 6, 7 and a layer of circumferential reinforcement elements 8. The layer of circumferential reinforcement elements is in FIG. 1 the radially outer part of the crown reinforcement and the two working layers 6, 7 are interposed between the carcass layer 2 and the layer of circumferential reinforcement elements 8. The layer of circumferential reinforcement elements advantageously consists of a single cord wound to form an angle with the longitudinal direction substantially equal to 0°. The layer of circumferential reinforcement elements may also be produced by the simultaneous winding of several bare cords or cords in the form of strips when they are immersed in rubber.

The working layers 6, 7 consist of textile reinforcements produced according to the invention with at least one continuous reinforcing cord forming parallel portions in the central zone of said layer and the adjacent portions being connected by U-shaped loops. The arrangement of the cords is such that the portions are crossed from a layer 6 to the following layer 7.

Figure 2:
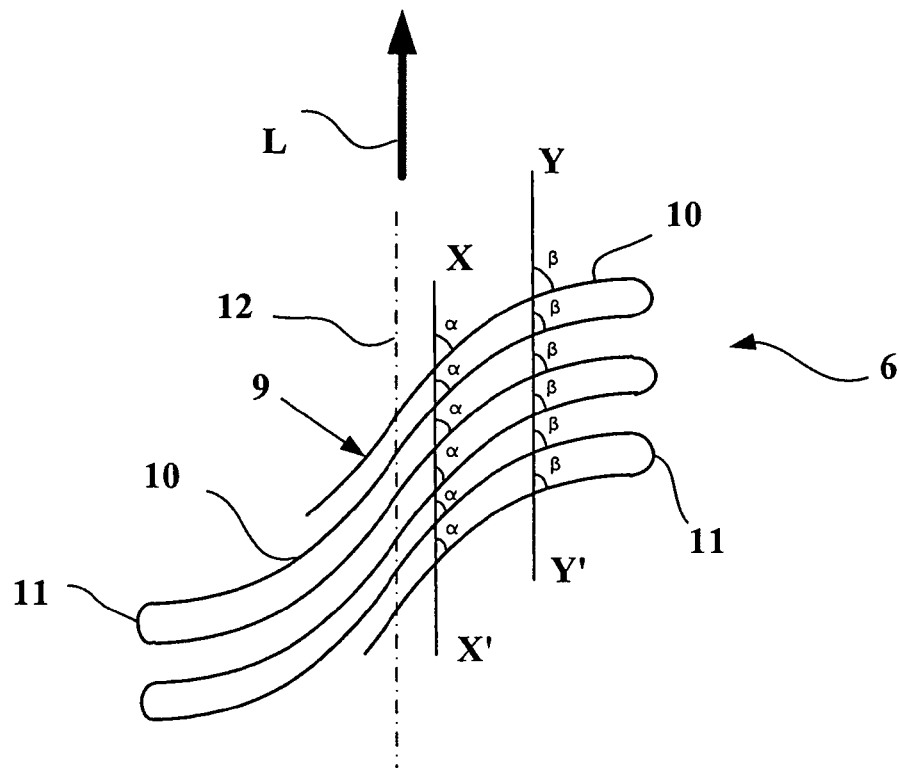
FIG. 2 is a diagrammatic representation of a working layer according to a first embodiment of the invention.

FIG. 2 illustrates an example of embodiment according to the invention of such a working layer 6 consisting of a single cord 9 positioned to form portions 10. Two adjacent portions are connected by loops 11. The portions 10 are so oriented that they form with the longitudinal direction L an angle of between 10 and 80°. In this illustration in FIG. 2, the portions are formed with an angle which may vary in such a way that, at the edges of the working layer 6, said angle becomes larger. Such a variant embodiment in particular allows considerable circumferential rigidity to be imparted around the equator, that is to say in the central part of the tire where the angles of said portions are smallest so as to resist centrifugation. On the other hand, the largest angles at the edge of the working layer 6 and advantageously at the level of the shoulders allow improvement of the grip and drive ability of the tire at a camber by optimizing the shearing rigidity of the working layers when the angle is around 45° or alternatively improvement of comfort at a camber when the angle approaches 90°.

FIG. 2 also shows two circumferential section planes XX' and YY' and the angles $\alpha$ and $\beta$ formed by the reinforcement elements with the longitudinal direction at the various points of intersection with said circumferential planes XX' and YY'. The angles $\alpha$ on the one hand and $\beta$ on the other hand are identical whichever reinforcement element is considered. Furthermore, the angles $\alpha$ and $\beta$ are different from one another.

FIG. 2 also shows that, when the layer 6 is centered on the crown or equator of the tire, the equator forms a line 12 comprising the inflection points of the portions 10 formed by the cord 9.

Figure 3:
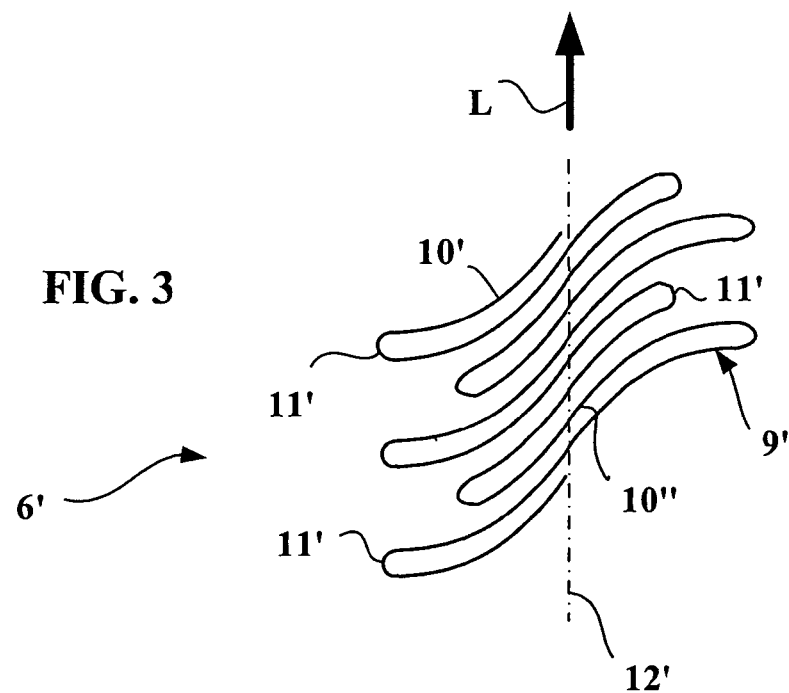
FIG. 3 is a diagrammatic representation of a working layer according to a second embodiment of the invention.

FIG. 3 illustrates another variant embodiment of the invention similar to that of FIG. 2 according to which the length of the portions is not regular. In the case of FIG. 3, the cord 9' is deposited so as to form portions 10', 10" of two different lengths. Such a configuration allows the obtainment of variations in density in the axial direction axial, the quantity of reinforcement elements varying in this same direction. Variations in density of this type are all the more significant in designing tires for motorcycles with regard to optimizing and adapting the different rigidities of the working layers required between the straight line positions and the various inclined positions of the tire due to the different parts of the tread and of the reinforcement structure which face the ground.

In the case of FIG. 3, two different portion lengths are provided, but the invention must not be interpreted as limited to this scenario, it being possible for the number of different portion lengths to be greater.

According to one or other of the embodiments illustrated in FIGS. 2 and 3, the layers 6 and 6' are preferably made with a single cord. However, for various reasons, deliberate or otherwise, in the case where several cords are used to produce a working layer 6, 7, 6', 7', the ends of said cords are located in the central part of the tire. More precisely, no free end appears at the edges of the working layers; all that is present at this level of the working layers is the loops 11, 11'.

Furthermore, with regard to the production of such a tire, this is advantageously obtained by manufacture of the hard core type. Thus, laying of the cords 9, 9' may be performed by a robot which deposits them precisely at the desired angles in their quasi-final position. In fact, hard core type manufacture allows precise positioning of the cords because, since the hard core sets the required internal cavity shape, the profile of the tire is not subject to modification during building.

Variants of the embodiment of FIG. 1 may provide a different stack of said layers constituting the crown reinforcement. In fact, in particular to reduce the costs in terms of material and also in terms of output or manufacturing time, the invention provides for the layer of circumferential reinforcement elements to be provided between the two working layers or alternatively radially to the inside of the working layers.

Figure 4:
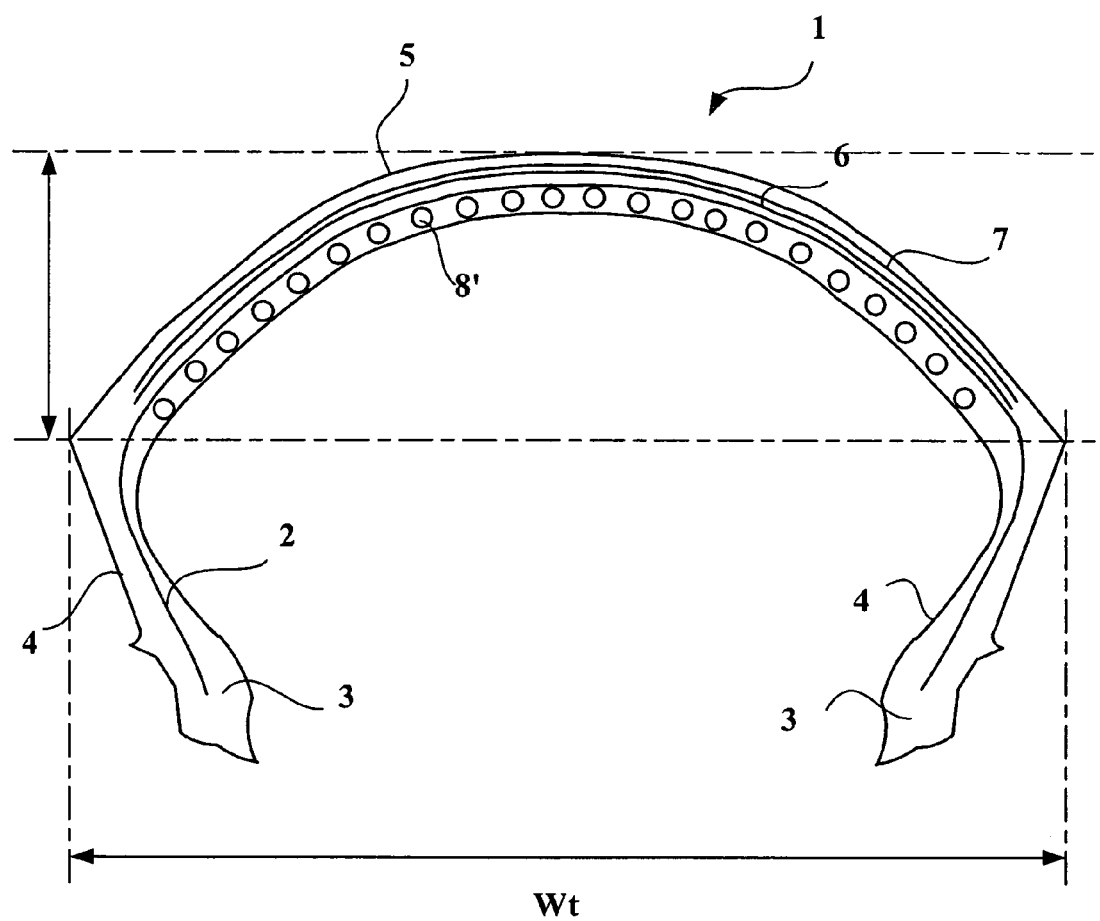
FIG. 4 is a meridian view of a diagram of a tire according to a second embodiment of the invention.

FIG. 4 shows a variant embodiment of FIG. 1. According to this variant embodiment, the layer of circumferential reinforcement elements 8' is provided radially to the inside of the carcass layer 2 radially covered with two layers 6 and 7 similar to those of FIG. 1. As mentioned above, an embodiment of this type allows financial savings on two counts. Firstly, the quantity of material used to form a layer of circumferential reinforcement elements identical to that of FIG. 1 is reduced due to the lower radial position of the layer 8' for one and the same tire in terms of dimensions. And consequently, the laying time for the reinforcement cord of said layer 8' is less than that necessary for provision of the layer of the tire shown in FIG. 1.

Other variants of the same type may be provided with different positioning of the various layers constituting the crown reinforcement. As for the variant embodiments envisaged in the case of FIG. 1, the layer of circumferential reinforcement elements may be positioned between or radially to the outside of the working layers. Such embodiments result in embodiments according to which at least one of the working layers is positioned radially to the inside of the carcass ply.

Figure 5:
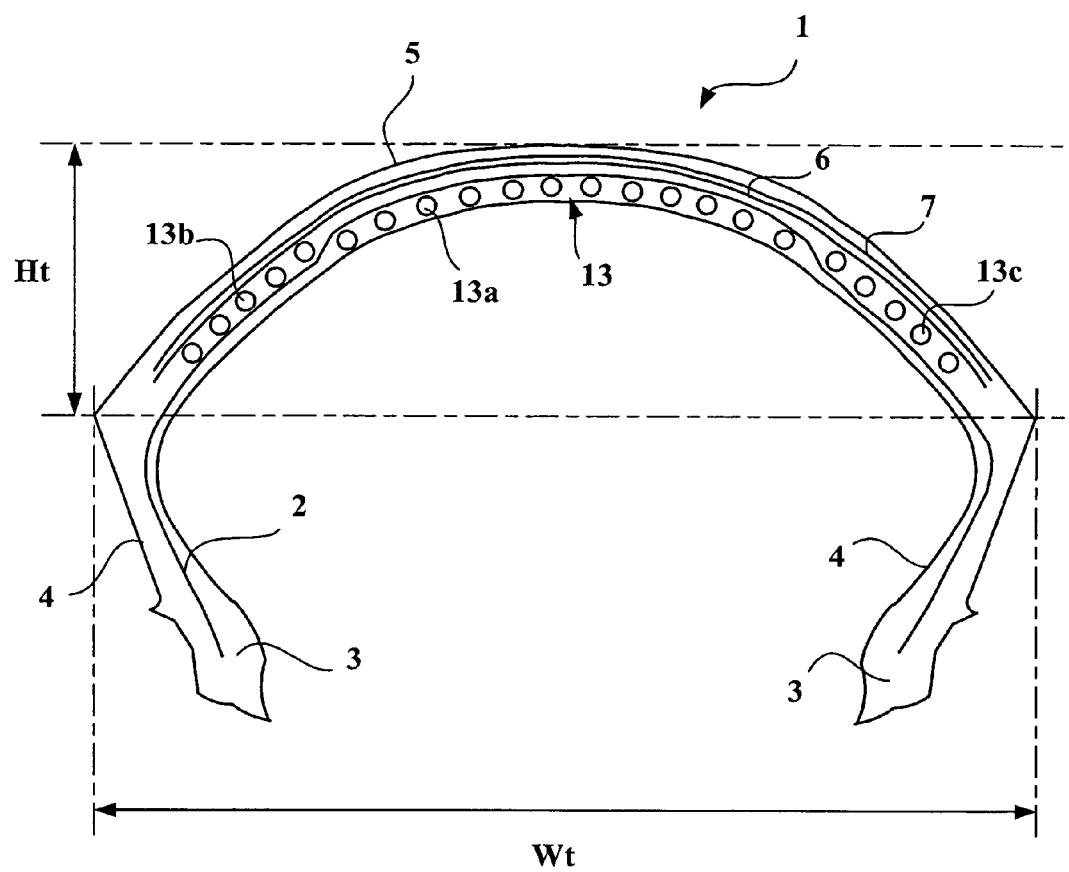
FIG. 5 is a meridian view of a diagram of a tire according to a third embodiment of the invention.

FIG. 5 shows an embodiment of the invention according to which the layer of circumferential reinforcement elements 13 is formed of several parts 13a, 13b, 13c positioned on the tire at radially different levels. Such embodiments, for example, allow the layer of circumferential reinforcement elements locally to maintain a protective role in particular with regard to the carcass ply and furthermore allow manufacturing costs to be reduced by forming said layer of circumferential reinforcement elements in part in radially lower positions. This choice may also influence other properties of the tire which are only required locally. In the case shown in FIG. 5, the position of the axially outer parts 13b, 13c radially to the inside of the working layers 6, 7 in particular allows an improvement in stability at a severe camber.

Figure 6:
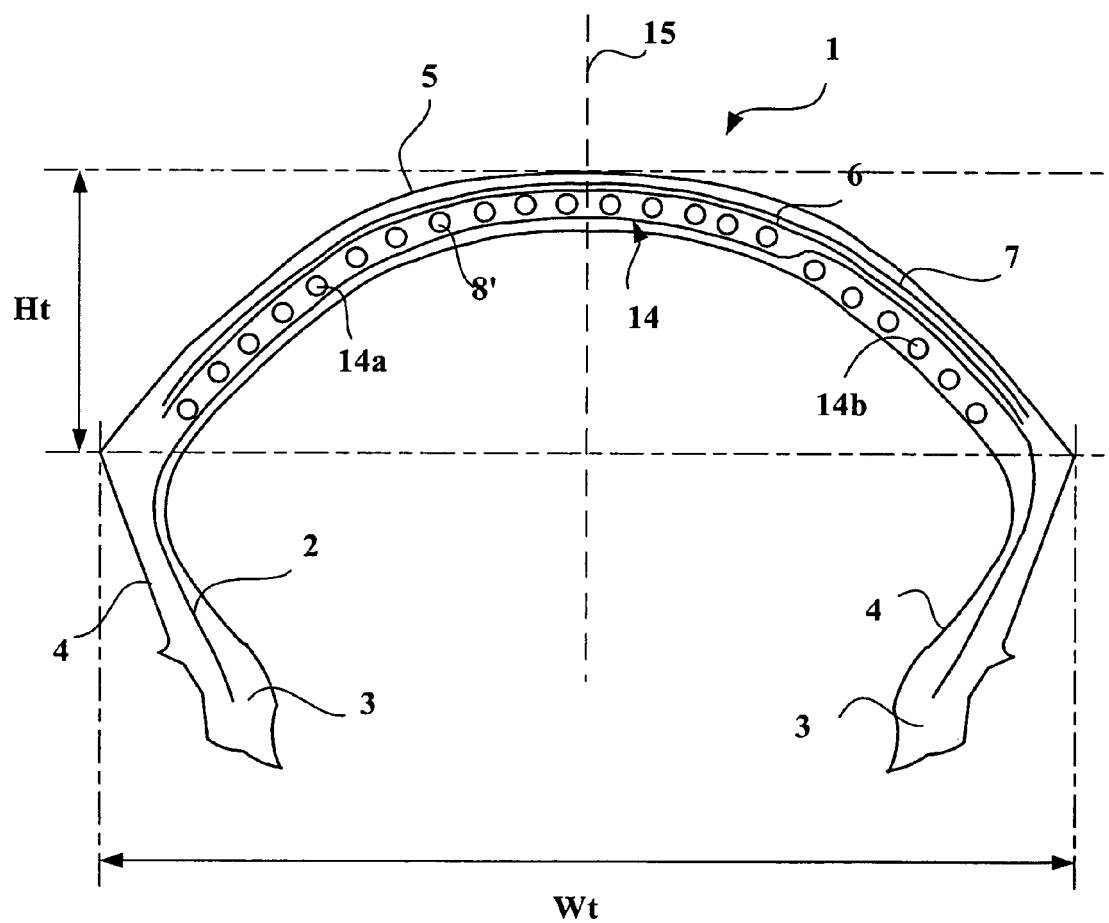
FIG. 6 is a meridian view of a diagram of a tire according to a fourth embodiment of the invention.

FIG. 6 shows, as in the case of FIG. 5, an embodiment of the invention according to which the layer of circumferential reinforcement elements 14 is provided in a number of parts 14a, 14b, positioned on the tire at radially different levels. In contrast to FIG. 5, the representation in FIG. 6 does not exhibit symmetry relative to the equatorial plane 15. Such an embodiment may be particularly sought after when use of the tire will itself not be symmetrical; for example, in the case of tires designed for use on specific circuits which subject the tire to camber stress along substantially one side. In fact, the provision of such a tire may be particularly relevant to use on a track where the majority of the curves or bends are in the same direction.

Such an embodiment of the layer of circumferential reinforcement elements in several parts may additionally be combined with the various variant embodiments of the invention presented above. It is possible in particular to provide a layer of circumferential reinforcement elements in part radially to the inside of or to the outside of or between the working layers 6, 7.

The various variant embodiments of the invention which have just been described allow the production of motorcycle tires in which no free end of the reinforcement elements is present at the edges of the working layers. This feature of the invention allows improvement of the quality and more particularly the grip, drive ability, comfort, or indeed the operating temperature of the tires without impairing the various desired properties associated with the provision of said tires.

The invention claimed is:

1. A motorcycle tire comprising at least one carcass-type reinforcement structure, formed of reinforcement elements, anchored on either side of the tire to a bead whose base is intended to be mounted on a rim seat, each bead being extended radially towards the outside by a sidewall, the sidewalls meeting up radially towards the outside with a tread having has a height Ht and a maximum width Wt corresponding to a maximum width of the tire, the ratio of Ht/Wt being in the range 0.2 to 0.5, and comprising under the tread a crown reinforcement structure comprising a working layer formed by at least one continuous reinforcement cord including cord portions in a central zone of said working layer, said cord portions displaying identical angles formed with the longitudinal direction, said angles being measured at the points of intersection of the cord portion with a circumferential plane, wherein two adjacent cord portions are linked by a U-shaped loop, and wherein the cord portions form an angle with the longitudinal direction of between 10 and 80°, wherein the angles formed by said portions with the longitudinal direction are variable in the transverse direction and wherein said angles are greater at their axially outer edges than at the level of an equatorial plane of the tire, wherein the angles of the portions continuously increase in monotonic manner from the equatorial plane of the tire as far as the edges of the working layer, wherein the largest angles of said portions approach 90°.

2. A tire according to claim 1, wherein, in the central zone of said layer, the portions are equidistant from one another along all circumferential planes.

3. A tire according to claim 1, wherein the crown reinforcement structure comprises at least two layers of reinforcement elements and wherein from one layer to the next the portions form between them angles of between 20 and 160°.

4. A tire according to one of claim 1, wherein the reinforcement elements of the carcass-type reinforcement structure form an angle of between 65° and 90° with the circumferential direction.

5. A tire according to one of claim 1, wherein the crown reinforcement structure comprises at least one layer of circumferential reinforcement elements.

6. A tire according to claim 5, wherein the layer of circumferential reinforcement elements is positioned at least in part radially to the outside of a working layer.

7. A tire according to claim 5, wherein the layer of circumferential reinforcement elements is positioned at least in part radially to the inside of the working layer radially furthest to the inside.

8. A tire according to claim 5, wherein the layer of circumferential reinforcement elements is positioned at least in part radially to the inside of the carcass-type reinforcement structure.

9. A tire according to claim 5, wherein the reinforcement elements of the layer of circumferential reinforcement elements are metal and/or textile and/or glass.

10. A tire according to claim 9, wherein the reinforcement elements of the layer of circumferential reinforcement elements exhibit a modulus of elasticity greater than 6000 $Nmm^2$.

11. A tire according to claim 1, wherein the carcass-type reinforcement structure is made of two half-plies extending from the shoulders to the beads.

12. A tire according to claim 1, wherein the working layer reinforcement elements are of textile material.

* * * * *